United States Patent [19]

Turbak et al.

[11] 4,302,252

[45] Nov. 24, 1981

[54] SOLVENT SYSTEM FOR CELLULOSE

[75] Inventors: Albin F. Turbak, Convent Station; Adel El-Kafrawy, Rockaway; Fred W. Snyder, Jr., Wharton; Andrew B. Auerbach, Livingston, all of N.J.

[73] Assignee: International Telephone and Telegraph Corp., New York, N.Y.

[21] Appl. No.: 145,333

[22] Filed: Apr. 30, 1980

Related U.S. Application Data

[63] Continuation-in-part of Ser. No. 60,814, Jul. 25, 1979, abandoned.

[51] Int. Cl.³ ............................................. C08L 1/00
[52] U.S. Cl. ............................... 106/163 R; 106/203; 264/187
[58] Field of Search ........................... 106/203, 163 R; 260/33.8 N; 264/187, 203

[56] References Cited

U.S. PATENT DOCUMENTS

| | | | |
|---|---|---|---|
| 625,033 | 5/1899 | Hoyne | 264/187 |
| 4,029,727 | 6/1977 | Austin et al. | 264/186 |
| 4,062,921 | 12/1977 | Austin | 264/186 |
| 4,076,933 | 2/1978 | Turbak et al. | 264/187 |
| 4,098,615 | 7/1978 | Cummisford et al. | 106/163 R |
| 4,098,859 | 7/1978 | Cummisford et al. | 106/163 R |
| 4,183,997 | 1/1980 | Stofko | 106/163 R |

FOREIGN PATENT DOCUMENTS

10410  4/1980  European Pat. Off. ........ 106/163 R

*Primary Examiner*—Jay H. Woo
*Attorney, Agent, or Firm*—J. B. Raden; H. J. Holt

[57] ABSTRACT

Cellulose is activated by penetration of the cellulose with a polar medium and mixed at a temperature at which no significant degradation occurs with an amide selected from the group consisting of dimethylacetamide, 1-methyl-2-pyrrolidinone and mixtures thereof and from 3 to 15% by weight of lithium chloride. The cellulose is then dissolved in the amide and lithium chloride in the substantial absence of any polar medium other than the amide. Shaped cellulosic products may be formed by reconstituting the cellulose in fiber, sheet or other form.

24 Claims, No Drawings

SOLVENT SYSTEM FOR CELLULOSE

This application is a continuation-in-part of our copending application Ser. No. 60,814, filed July 25, 1979 now abandoned.

This invention relates to a process for dissolving cellulose, to the resulting cellulosic solutions and to a process for reconstituting shaped products from the cellulosic solutions.

Investment costs and environmental problems have made it increasingly important to find alternatives to the viscose process for producing rayon. A number of alternative processes have been suggested or disclosed in the literature but none have yet demonstrated the capability of displacing viscose as the almost universal process for the commercial production of rayon.

It is a principal object of the present invention to provide a solvent system for cellulose which may be used for the production of reconstituted cellulosic products.

It is an additional object of this invention to provide a solvent system for cellulose from which high quality cellulosic products may be produced economically on a commercial basis.

It is still an additional object of this invention to provide a solvent system for cellulose, the constituents of which may readily be recovered and recycled with minimal environmental impact.

It has been found that the foregoing and other objects of the invention may be achieved by mixing activated cellulose at a temperature at which no significant degradation occurs with an amide selected from the group consisting of dimethylacetamide, 1-methyl-2-pyrrolidinone and mixtures thereof and from 3 to 15% by weight of lithium chloride, based on the weight of the cellulosic solutions, and then dissolving the cellulose in the amide and lithium chloride. The dissolution process is particularly useful for making reconstituted cellulose products. The products are unique in that the system dissolves the cellulose without forming a derivative as, for example, is done in the viscose process. The products recovered from the solution are therefore "reconstituted" rather than "regenerated". As such, there is no significant change in degree of polymerization from the starting cellulose to the shaped product. In addition to being useful for making shaped products such as fibers, films, tubular casings or foams, the solutions are also useful as adhesives, binders for non-wovens, coatings, sizing agents, saturants for reinforcing webs or other matrices, as media for further reactions on the cellulose backbone and for physical characteristics studies of cellulose.

Shaped cellulosic products may be prepared from the solutions of the invention by a variety of techniques. They may be prepared by contacting the cellulosic solution with a non-solvent for the solution to reconstitute the cellulose in the desired shape. Fibers may be prepared by wet spinning, by dry jet-wet spinning or by dry spinning. Wet spinning techniques involve the spinning of the solution directly into a coagulant such as water, a lower monohydric alcohol, pyridine, acetonitrile, tetrahydrofuran or mixtures thereof. Dry jet-wet spinning involves the spinning of the fibers into the air to align the cellulose molecules prior to coagulation and then passing the aligned fibers into a non-solvent coagulation bath. In dry spinning, the solution is spun into the air and a heated blast of hot air evaporates the solvent. The fibers are then led to bath to wash out the lithium chloride salt. Both dry jet-wet spinning and dry spinning should normally be carried out with high solids cellulose solutions, that is solutions with above about 10% cellulose by weight.

The use of lithium chloride and dimethylacetamide to dissolve nylon polymers is known (see S. L. Kwolek et al, Macromolecules, Volume 10, No. 6, p. 1390, 1977 and T. I. Bair et al, ibid, p. 1396). In addition, the use of lithium chloride and either dimethylacetamide or 1-methyl-2-pyrrolidinone for dissolving chitin is disclosed in U.S. Pat. No. 4,062,921. Chitin, a material found, for example, in the hard shells of insects and crustacea, is an acetylated form of D-glucosamine and, like nylon, possesses an amide linkage. This similarity may account for the similar solubility behavior of chitin and nylon in this solvent system. However, chitin's chemical reactivity and solubility are very different than that of cellulose and insofar as is known, this solvent system has never been used, or suggested for use, with cellulose. Moreover, as will become apparent hereinafter, the present invention involves more than the simple dissolution of cellulose in the solvent system.

A critical aspect of the invention involves the use of cellulose which has been activated to swell the cellulose and open its pores. The pores of cellulosic fibers have a natural tendency to close, when wet by a polar solvent such as water and then dried, and once closed, hydrogen bonding tends to keep them closed. Cellulosic fibrils have potentially tremendous surface areas - but these must be unblocked and made available to the lithium chloride salt. The dimethylacetamide or 1-methyl-2-pyrrolidinone solvents are not sufficiently good wetting agents alone when unheated to open the pores of the cellulose. Thus the cellulose must be activated by additional means in order to dissolve in the solvent system of the invention. Cellulose will dissolve in lithium chloride and dimethylacetamide or 1-methyl-2-pyrrolidinone if the mixture is heated to temperatures of about 150° or higher. At these temperatures, however, the solutions become discolored and the intrinsic viscosity drops significantly (e.g. from about 3.0 to about 1.8 or less) indicating polymer chain shortening has occurred. Such a result is unsatisfactory as the solutions will not produce cellulosic products of acceptable quality. Thus, dissolution must take place at temperatures below that at which significant degradation occurs.

Activation of the cellulose, in accordance with the invention, is accomplished by penetration of the cellulose with a polar medium which swells the cellulose to open its structure to permit access by the solvent at ambient temperatures, or at least at temperatures low enough to avoid significant polymer degradation, normally less than 150° C. We have found, further, that any polar medium used for activation, other than dimethylacetamide or 1-methyl-2-pyrrolidinone, should be substantially absent during dissolution or dissolution will not be complete. Many of the polar materials which act to wet or swell cellulose contain active hydrogen and act as cellulose precipitants or regenerants. The polar media also wet the cellulose and prevent access by the amide-lithium chloride solvent system. If used for activating the cellulose, such polar media should therefore be removed to a final concentration less than that of the cellulose and generally less than 5%. The seemingly conflicting requirement that a polar medium be used for activation, but be substantially absent for dissolution, has led to the discovery of a number of alternative routes for the dissolution of cellulose.

All of the routes involve the penetration of the cellulose with a polar medium. If the polar medium is not one of the amide solvents, the polar medium must then be removed by exchange with either a medium less than polar than water or with dimethylacetamide or 1-methyl-2-pyrrolidinone. If it is removed by exchange with a less polar medium, it should then be dried prior to dissolution. Upon drying, the pores will not collapse as they would do when drying cellulose impregnated with a polar medium. Examples of media less polar than water which do not swell the cellulose and which are useful in the invention are acetone, methanol, ethanol, isopropanol, acetonitrile and tetrahydrofuran. If the polar medium is removed by exchange with dimethylacetamide or 1-methyl-2-pyrrolidinone, the cellulose will dissolve upon addition of lithium chloride.

A number of polar media act as swelling agents for cellulose and can thus be used to open the cellulose structure sufficiently to allow the amide and lithium chloride to dissolve the cellulose at ambient conditions. Water, steam and liquid ammonia are illustrative polar media which produce clear solutions. The use of water to pre-swell cellulose is known and, in fact, a water pre-activation step followed by exchange of the water with acetic acid is presently used commercially in the manufacture of cellulose triacetate. However, water activation and exchange has never been suggested, insofar as we know, for achieving solubility in a solvent system resembling that of the present invention. In the present invention, the cellulose may be soaked in water, squeezed free of excess water and then exchanged with dimethylacetamide or 1-methyl-2-pyrrolidinone to produce an activated cellulose ready for dissolution. Steaming the cellulose for several minutes, followed by dimethylacetamide or 1-methyl-2-pyrrolidinone exchange also produces an activated cellulose which will readily dissolve under ambient conditions. Cellulose which has been soaked in liquid ammonia and the ammonia evaporated also produces clear solutions at room temperature, if the amide is added prior to the evaporation of the ammonia.

As previously indicated, cellulose which has not been activated will not dissolve directly in an amide and lithium chloride solution unless the solution is heated to a temperature at which significant degradation of depolymerization occurs, usually about 150° C. or higher. It has, however, been found that cellulose may be activated by using hot vapors of one of the solvent amides. Cellulose is mixed with dimethylacetamide or 1-methyl-2-pyrrolidinone and the slurry brought to a boil for a short period. The heating is stopped, the slurry cooled to well below 150° C., e.g. about 100° C., the lithium chloride added and the mixture stirred for several hours until the cellulose goes into complete solution. It appears that at or near its boiling point, the amide has sufficiently high vapor pressure to enable it to penetrate through the fiber capillaries, thus swelling the fibers. Upon LiCl addition to the slurry, interaction between LiCl and dimethylacetamide occurs in and around the cellulose fibers and dissolution occurs. Such solutions have been found to be clear, not colored, and give recovered cellulose with an I.V. (intrinsic viscosity) of 2.7 as compared to a starting I.V. of 3.0. Such a change in I.V. is normally considered to indicate insignificant polymer degradation or reduction in degree of polymerization.

The foregoing route to activation and dissolution is based upon our finding that the amide and lithium chloride form a complex which is acidic in nature. A simple check of a solution of dimethylacetamide and lithium chloride in water showed that the solution is acidic to litmus which is surprising since neither is acidic alone. This led to the realization that polymer degradation that occurs when cellulose, dimethylacetamide and lithium chloride are heated is the result of the acidic nature of the foregoing complex. By penetration of the cellulose with hot solvent alone, without the lithium chloride, the cellulose may be activated with the amide and without polymer damage. The lithium chloride may then be added at temperature at which no depolymerization occurs from the presence of the acidic complex.

Still another method of activating the cellulose for dissolution is by mechanical opening of the cellulose structure to aid penetration by one of the polar media. This may be done by passing a liquid suspension of the cellulose through an homogenizer under high pressure. In such a process, energy is applied to a low viscosity cellulose suspension by a high velocity flow through a restricted area. Repeated passage of the cellulose suspension through such a homogenizer microfibrillates the cellulose without significant effect on its degree of polymerization. The liquid in which the cellulose is suspended for passage through the homogenizer may be water, dimethylsulfoxide, a water solution of ammonia, dimethylacetamide or other polar solvent. Microfibrillated cellulose will dissolve in dimethylacetamide or 1-methyl-2-pyrrolidinone and lithium chloride without heating and without the necessity for the use of other polar solvents for activation of the cellulose. If the polar liquid used for preparing the microfibrillation slurry is not dimethylacetamide or 1-methyl-2-pyrrolidinone, then it should be exchanged with a liquid less polar than water such as acetone, tetrahydrofuran or isopropanol which does not wet the cellulose or with dimethylacetamide or 1-methyl-2-pyrrolidinone. If it is exchanged with a non-polar liquid, then it should be dried prior to dissolution. If it is exchanged with dimethylacetamide or 1-methyl-2-pyrrolidinone, then it will dissolve upon addition of the lithium chloride.

The foregoing routes to the activation of the cellulose all involve separate cellulose treatment and accordingly would add to ultimate product costs. It would be desirable, of course, to eliminate such separate treatment and it has been found that this may in fact be accomplished and the cellulose activated without separate treatment by combining the dissolving stage with the recovery and recycle stages.

Since the cellulose-lithium chloride-amide dopes would ultimately have to be water washed to remove the lithium chloride and the dimethylacetamide, the commercial process would produce a LiCl/Amide/H$_2$O liquor for recovery and recycle. Rather than trying to purify the LiCl/Amide by removing the water for use in dissolving an activated cellulose, we have found that excellent cellulose solutions may be prepared simply by adding regular cellulose to the LiCl/Amide/H$_2$O recovery liquor followed by fractional distillation of the excess water. It was found that it was necessary to fractionally distill the water until the water left behind was not more than about 5% of the solution weight, preferably not more than 4%, or dissolution of cellulose would not take place. Above about 5% water, some undissolved fibers were present in the solution. The presence of over 5% water appears to hydrate and lithium chloride and destroy its affinity for cellulose. (5% water is of course many times that percentage with respect to lithium chloride weight.) This procedure for combined dissolution-recovery-recycle is economically preferable to any of the other methods for activating and dissolving the cellulose. Using this procedure, solutions of cellulose may be prepared with up to 16% by weight of cellulose. Textile quality fibers and films of good quality have been successfully spun from the solutions.

The invention is specific to lithium chloride on the one hand and either dimethylacetamide or 1-methyl-2-pyrrolidinone on the other hand. A large number of halide salts were tried over various concentrations, temperatures and pressures with such solvents as dimethylacetamide, 1-methyl-2-pyrrolidinone, dimethylformamide, formamide, trifluoroacetamide, tetramethylurea, dimethylsulfoxide, piperidine, pyridine, sulfolane, ethylformate and others. Temperatures ranged as high as 210° C. and pressures ranged from atmospheric to 572 kilopascals. Of all the systems tested, only lithium chloride and either 1-methyl-2-pyrrolidinone or dimethylacetamide were able to dissolve the cellulose. All other combinations of salts and solvents, regardless of temperature, or pressure produced no dissolution.

The lithium chloride should be present in amounts ranging from 3 to 15% by weight of the solution. Amounts of lithium chloride of less than about 3% tend to be insufficient to dissolve the cellulose. With amounts above 15%, the amide becomes supersaturated and tends to salt the dissolving cellulose out of solution. A preferred lithium chloride concentration is about 5 to 12% by weight. The process has been successful in obtaining solutions of as much as 16% by weight of cellulose, based upon total solution weight. The remainder of the solution will usually be dimethylacetamide or 1-methyl-2-pyrrolidinone. A wide variety of cellulosic sources may be used in preparing the solutions of the invention such as chemical pulps, either sulfite, prehydrolyzed kraft, bleached or unbleached. Cotton linters, reprocessed cellulose and purified bast fibers are other typical sources of cellulose. Unpurified cellulose (i.e. sawdust) can also be utilized but with far less efficiency than purified sources.

The following examples are illustrative of the practice of the invention. All parts and percentages are by weight unless otherwise indicated.

EXAMPLE 1

This example illustrates the activation of cellulose by the use of hot vapors of one of the solvent amides. Prehydrolyzed kraft pulp, cut to pass through a 0.125 inch screen, was placed in a flask to which dimethylacetamide was added. The mixture was heated for 30 minutes with continuous stirring at reflux temperature (165° C.). The slurry was then allowed to slowly cool to 100° C. at which point anhydrous lithium chloride was added with constant stirring. The mixture was then allowed to cool to room temperature and left stirring overnight. The composition of the mixture by weight percent of cellulose/lithium chloride/dimethylacetamide was 5.9/8.6/85.5. The following morning, the cellulose had completely dissolved and the mixture was a water clear solution. The solution was then diluted with 60 ml of dimethylacetamide, centrifuged for one hour and suction filtered. The filtrate was regenerated in water and the intrinsic viscosity determined. This example was repeated with a series of different pulp grades, varying the solvent and the relative proportions of cellulose, solvent and salt. In one case, sawdust was used in place of cellulose. In all cases, the salt was lithium chloride. The results of these tests are set forth in Table I. Cuene I.V. is the intrinsic viscosity of the regenerated cellulose as measured in a one molar concentration solution of cupriethylene diamine.

TABLE I

| Sample | Cellulose Source | Solvent | Composition* | Result | Initial Cuene I.V. | Cuene I.V. |
|---|---|---|---|---|---|---|
| 1 | Prehydrolyzed Kraft Pulp | Dimethylacetamide | 5.9/8.6/85.6 | Dissolution | 3.0 | 2.64 |
| 2 | Prehydrolyzed Kraft Pulp | 1-methyl-2-pyrrolioinone | 1.8/7.3/90.9 | Dissolution | 3.0 | 2.52 |
| 3 | Sulfite Pulp | Dimethylacetamide | 4.9/8.6/86.5 | Dissolution | 9.0 | 7.13 |
| 4 | Cotton Linters | Dimethylacetamide | 3.1/8.8/88.1 | Dissolution | — | 6.44 |
| 5 | Prehydrolyzed Kraft Pulp | Dimethylsulfoxide | 2.0/8.9/89.1 | Degradation | 3.0 | 0.57 |
| 6 | Prehydrolyzed Kraft Pulp | Dimethylformamide | 2.2/8.9/88.9 | No Dissolution | 3.0 | — |
| 7 | Prehydrolyzed Kraft Pulp | Formamide | 2.9/8.8/88.2 | No Dissolution | 3.0 | — |

*Weight percent cellulose/LiCl/Solvent.

Table I demonstrates that, of the solvents tested, only dimethylacetamide and 1-methyl-2-pyrrolidinone were effective in dissolving cellulose in the presence of LiCl. Even very high D.P. (degree of polymerization) materials can be dissolved with relatively little D.P. loss indicating little degradation.

EXAMPLE 2

This example illustrates the activation of cellulose with water, followed by solvent exchange and then dissolution. Two hundred and eighty grams of prehydrolyzed kraft pulp (cuene I.V. of 3.00) were cut into 5×5 inch sheets and soaked in 1.2 liters of water at room temperature for 10 minutes and then passed between two 6×6 inch stainless steel mesh screens with cellulose pulp sheets above and below acting as blotting media. 200 psig (x 6.89=13,780 k Pa) pressure was applied for ten minutes. The pulp sheets were then soaked in 800 ml. of dimethylacetamide at room temperature for 30 minutes and then pressed again at 2000 psig as described above. A sample of the activated pulp was analyzed for water content and found to contain 8.5% water. The pulp sheets were shredded and then mixed with a solution of 400 grams of anhydrous lithium chloride in 4000 grams total dimethylacetamide at room temperature for three hours. Dissolution was achieved after standing overnight. The solution contained 0.51% water. Cellulose concentrations of up to about 6.5% were achieved using this water activation technique. A cuene I.V. of 2.83 was obtained for the regenerated cellulose pulp.

EXAMPLE 3

The procedure of Example 2 was further tested with other salt/aprotic polar solvent systems. Lithium chloride was tested with 1-methyl-2-pyrrolidinone, dimethylformamide, dimethylsulfoxide, formamide or ethanolamine. Dimethylacetamide was also tested using calcium chloride or magnesium chloride as the salt. In all cases, cellulose was activated by soaking in water, the water was exchanged with the named solvent and then dissolution was attempted with the salt/solvent system. The results are set forth in Table II.

TABLE II

| Sample | Salt/Solvent | Cellulose/Salt/Solvent Composition | Result |
| --- | --- | --- | --- |
| 1 (Example 2) | LiCl/DMAC[1] | 6.0/8.5/85.5 | Dissolution |
| 2 | LiCl/MP[2] | 2.9/8.8/88.3 | Dissolution |
| 3 | LiCl/MP[2] | 4.3/8.7/87.0 | Dissolution |
| 4 | LiCl/DMSO[3] | 2.2/8.9/88.9 | No Dissolution |
| 5 | LiCl/DMF[4] | 2.2/8.9/88.9 | No Dissolution |
| 6 | LiCl/Formamide | 2.2/8.9/88.9 | No Dissolution |
| 7 | LiCl/Ethanolamine | 2.1/4.2/93.7 | No Dissolution |
| 8 | CaCl$_2$/DMAC[1] | 2.3/4.6/93.1 | No Dissolution |
| 9 | MgCl$_2$/DMAC[1] | 2.1/9.4/88.5 | No Dissolution |

[1] DMAC is dimethylacetamide
[2] MP is 1-methyl-2-pyrrolidinone
[3] DMSO is dimethylsulfoxide
[4] DMF is dimethylformamide It will be seen from Table II that only lithium chloride as the salt and either dimethylacetamide or 1-methyl-2-pyrrolidinone as the solvent were successful in obtaining cellulose dissolution by the water activation and solvent exchange technique of Example 2.

EXAMPLE 4

Steam activation, followed by solvent exchange and dissolution, was employed for the preparation of a 2.5 kg solution of cellulose/LiCl/dimethylacetamide of composition 6.0/8.5/85.5. Thus, 140 g of prehydrolyzed kraft pulp sheets were cut into 5×5 inch sheets and each was exposed to steam for 2 minutes, then soaked in 700 ml of dimethylacetamide for one hour with constant agitation to insure good solvent exchange. The water content of the exchanged pulp as determined by analysis was 5.24% after pressing the sheets at 15,000 psig. The sheets were shredded as described in Example 2 and then mixed with a solution of 200 g LiCl in 2000 g dimethylacetamide. Dissolution of the pulp occurred in less than 4 hours at room temperature. The solution contained 0.29% water.

Instead of preactivating the pulp with water or steam as in Examples 2–4, cellulose was soaked in dimethylacetamide containing 5, 10 and 20% water. When lithium chloride was subsequently added, cellulose solutions were not obtained at room temperature. This indicates that the sequence of exposure to water, and not the mere presence of water is important to obtaining cellulose dissolution, particularly if the samples are not heated.

EXAMPLE 5

This example illustrates the activation of cellulose with liquid ammonia. One gram of prehydrolyzed kraft pulp, cut to pass through a 0.125 inch screen, was weighed in a glass trap immersed in a dry ice-acetone bath. Gaseous NH$_3$ was passed through the trap and in 10 minutes, about 35 ml of liquid NH$_3$ was condensed in the trap. The pulp was soaked in the NH$_3$ for 15 minutes after which slow evaporation of the NH$_3$ took place over a period of 25 minutes. The evaporation was conducted with the aid of a warm bath. Before all the NH$_3$ was evaporated, 40 grams of DMAC were added and the last traces of NH$_3$ were forced out by a stream of N$_2$ blowing through the mixture. The pulp was then treated with 10% LiCl in dimethylacetamide and stirred overnight at room temperature. The composition of the original mixture was 2.2/8.9/88.9. A clear solution of cellulose was obtained. Gaseous ammonia alone did not give similar results.

EXAMPLE 6

This and the following three examples illustrate the mechanical opening of the cellulose structure to aid penetration by one of the polar media and thus facilitate activation. A 2% slurry of prehydrolyzed kraft pulp in dimethylsulfoxide was microfibrillated by passing through an homogenizer at 8000 psig at a temperature of 90°–100° C. The microfibrillated cellulose was suction filtered, washed with acetone, oven dried at 60° C. for 2 hours and then stirred in a 5% LiCl/dimethylacetamide solution at ambient temperature overnight. A clear cellulose/LiCl/dimethylacetamide solution of composition 2.3/4.7/93.0 was formed. A photomicrograph showed the presence of few fibrils. The cellulose could be regenerated from various non-solvents, acetone and acetonitrile, in the form of fiber, tubular film or flake. Little degradation was observed as evidenced by cuene I.V. values in the range 2.49–2.68.

EXAMPLE 7

A 2% slurry in water of the cellulose pulp of Example 6 was preheated at 75° C. and then passed through an homogenizer at 8000 psig at 100° C. The slurry was then suction filtered and the pulp was solvent exchanged with dimethylacetamide for 48 hours at room temperature and then suction filtered. The resultant pulp was then treated with a solution of 10% LiCl in dimethylacetamide at room temperature to form a clear colorless cellulose/LiCl/dimethylacetamide solution of composition 2.2/8.9/88.9.

EXAMPLE 8

An alternative method of using microfibrillated cellulose to facilitate activation and solution is to mix the three components of the solution system simultaneously in the homogenizer. Thus, increasing amounts of the cellulose pulp of Example 6 were microfibrillated by addition to circulating dimethylacetamide in the homogenizer until a 4% slurry of microfibrillated pulp was formed. Successive batches of anhydrous LiCl were added at 2.5%, 5%, 7.5% and 10% levels. The temperature of the circulating slurry was kept below 110° C. at 6000 psig pressure drop in the homogenizer. Samples of the mixture were withdrawn after each addition of LiCl and stirred overnight at room temperature. Photomicrographs indicates that mixtures containing at least 5% LiCl showed partial dissolution without caramelization. However, when the batch containing 10% LiCl was further heated at 160° C. for 15 minutes, then cooled at room temperature, carmelization accompanied dissolution, indicating significant depolymerization.

EXAMPLE 9

A 3% slurry of prehydrolyzed kraft pulp in dimethylacetamide was microfibrillated in an homogenizer at 3000 psig pressure drop with a maximum temperature of 125° C. LiCl was then added externally to each of two batches of homogenized slurry under different conditions. The first batch had a composition of 3/8/89. It was heated at 165° C. for 30 minutes and then cooled to room temperature. Dissolution accompanied by carmelization occurred after stirring overnight. The cuene I.V. of regenerated cellulose was 1.77 compared with a cuene I.V. of the original cellulose of 3.0.

The second batch (composition 2.2/7.8/90.0) was heated to 80° C. and then cooled to room temperature. Within 2 hours dissolution occurred. The regenerated cellulose gaveacuene I.V. of 2.54.

EXAMPLE 10

This example illustrates the dissolution of cellulose in a LiCl/Amide/H$_2$O recovery liquor. A recovery liquor containing 20 g LiCl, 200 g dimethylacetamide and 500 g H$_2$O was fractionally distilled at atmospheric pressure and 110° C. pot temperature/100° C. overhead temperature until 450 g of H$_2$O were removed. At that point, 10 g of cellulose pulp was added and the distillation was continued until all the remaining water was removed. This took place at a pot temperature of 120° C. and 200 m.m. pressure. The remaining suspension in the pot now had less than 1% H$_2$O and the cellulose fibers were still whole and readily dispersed. This is advantageous in terms of commercially being able to pump or otherwise transfer such slurries to proper storage tanks. The dispersion was allowed to sit without stirring to cool and after cooling and sitting for at least 6 hours there appeared in the flask a very viscous clear dissolved cellulose solution in LiCl/dimethylacetamide.

EXAMPLE 11

A solution of cellulose in lithium chloride and dimethylacetamide was prepared as set forth in Example 10. The viscosity of the solution was determined with a Brookfield viscometer and found to be 40,000 cps at 25° C. The solution was filtered through a pancake polypropylene filter and spun on a bench scale vertical spinning unit into a variety of primary baths at 25° C. The compositions of the primary baths were as follows: water, methanol, isopropanol, pyridine, acetonitrile, tetrahydrofuran and various mixtures of the foregoing containing equilibrium amounts of LiCl/DMAC. The fibers were led through an air secondary bath to a secondary godet. A 300-hole, 63.5 micron glass spinnerette was used in the spin bath.

All samples were processed as staple fibers in 70° C. water, centrifuged and oven dried at 100° C. overnight. Cuene I.V. analysis were determined for the spun fibers and also on pulp reconstituted from the original cellulose solution. The final I.V. was 2.95 as compared with an original I.V. of 3.0. In addition to the fibers, good quality films, membranes and tubular pure cellulose and reinforced cellulose films for casings were prepared simply by changing the spinnerette design to make the desired shape.

EXAMPLE 12

This example illustrates the use of never-dried slash pine sawdust instead of purified pulp. 20 g of the never-dried sawdust of 20 mesh size particles (containing 47% water) was mechanically beaten in 200 ml water for 10 minutes, left standing overnight and then suction filtered. A recovery liquor containing 20 g LiCl, 200 g dimethylacetamide and 100 g total water was fractionally distilled as described in Example 10. Analysis of the material which dissolved in LiCl/DMAC indicated that 13.5% of the theoretical cellulose fraction (about 40% in sawdust went into solution.

EXAMPLE 13

Three-hundred grams of prehydrolyzed kraft pulp, cut to size to pass through a 0.125 inch screen, was slurried into 2 liters of water. After soaking for ½ hour, the slurry was filtered through a large coarse frittered glass filter funnel using house vacuum. The wet pulp was then squeezed further by use of a rubber dam to remove excess adhering water. Dimethylacetamide was then added to the filter funnel and the water activated pulp was slurried. Vacuum was applied, excess liquid removed and the solid was again rubber dam squeezed. The dimethylacetamide treatment was repeated a second time and the final rubber dam squeezed activated and exchanged cellulose pulp was cooled overnight and used for solution preparation as follows:

In a 1 gallon twin blade mixer, 1380 cc of dimethylacetamide (1286 grams) was placed. The heating jacket brine was turned on, the mixer was started running, and then 235 grams of LiCl was introduced. The LiCl/DMAC was mixed for 1 hour at 61° C. to insure good solution of the LiCl. The previously preactivated pulp was then added to this stirred LiCl/DMAC solution over a 40 minutes period. The hot brine was turned off and the total mixture was mixed for 20 minutes. Cold brine was then circulated in the cooling jacket and the mass was stirred for an additional 4 hours at 0° C. The thoroughly mixed and highly swollen slurry was placed in a refrigerator at 5° C. for 2 days and the cellulose was totally dissolved as evidenced by microscopic examination. The solution contained 15% cellulose, 12% LiCl and 73% DMAC.

EXAMPLE 14

A solution of 6% cellulose in LiCl/DMAC was prepared using water activated/DMAC exchanged pulp in the manner described in Example 2 to give a final composition of 6/8/86 cellulose/LiCl/DMAC. The solution had a viscosity of 54,000 cps at 25° C. and was spun at 31 p.s.i. through a 300 hole, 63.5 micron per hole glass spinnerette into an acetonitrile coagulation bath. The spinning conditions were as follows:

Jet stretch=1.655; godet stretch=78.5% primary coagulation=acetonitrile at 23° C.; secondary baths=air at 23° C.

The fibers were washed with water at 65° C., squeezed dry, soaked in a standard rayon fiber finish (that sold under trademark Nopco RSF-15), centrifuged to remove excess finish and then oven dried overnight at 100° C. These fibers had a cuene I.V. of 2.68 as compared to starting pulp I.V. of 3.0 showing very little less in polymer D.P. as a result of total processing. The fibers had a water retention of 72% and had the following physical properties:
Denier 1.23

Conditioned Tenacity 3.74 g/d
Wet Tenacity 2.64 g/d
Conditioned Elongation 6.20%
Wet Elongation 8.70%
Wet Modulus 1.40 g/d at 5% elongation These results demonstrate that good quality high wet modulus fibers can be prepared from cellulose/LiCl/DMAC solutions by wet spinning techniques.

EXAMPLE 15

The high cellulose solids solution described in Example 13 above which contains 15% cellulose, 12% LiCl and 73% DMAC has a viscosity of several million cps at 25° C. and is essentially a clear gel. 300 cc of this high solids solution is placed into a high pressure extruder equipped with a 36 hole, 200 micron per hole spinnerette. The solution is heated in this high pressure extruder to 110° C. with the electrical band heaters surrounding the extrusion barrel and is deaerated with house vacuum over a 3 hour period to remove all bubbles originally present.

The extruder is then swung into a fully upright vertical position and fibers are extruded downward at the rate of 10 grams per minute through an air gap that ranges from ½ inch up to 3 ft. in length. The draw ratio is adjusted to give fibers of desired ultimate denier and the air drawn fibers are passed into a coagulation bath. This bath can contain any of the previously described coagulants, but in this case it contains water. The fibers then pass under a primary godet to a secondary godet whereby they receive an additional secondary stretch which is sufficient to give final fibers of 2 denier. The fibers are subsequently washed free of remaining LiCl and dimethylacetamide, squeezed, treated with a standard rayon fiber finish, centrifuged and oven dried in a hot air oven.

Fibers may be produced by this technique, the dry jet-wet spinning at high cellulose solids solutions, having an excellent wet/dry tenacity retention ratio and a wet modulus over 0.40 which increases depending on the dry jet stretch and the wet godet secondary stretch levels.

EXAMPLE 16

The high cellulose solids solution described in Example 13 above which has the composition 15/12/73 cellulose/LiCl/DMAC is spun in a pilot plant dry spin column normally used to spin cellulose acetate dopes. In this case, however, the hot air temperatures are modified to remove the dimethylacetamide without causing fiber degradation or cellulose caramelization. To achieve this, the air heaters and air flows are programmed so that the extruded fibers never reach a temperature above 140° C. The fibers exiting from the bottom of the column at 300 meters/minute are led into a counter current hot water bath where they are further stretched while the LiCl is washed out and led to the recovery and recycle towers.

Fibers may be produced by this technique, the dry spinning of high cellulose solids solutions, having an excellent balance of conditioned/wet tenacity and conditioned/wet elongation and having a high wet modulus.

While Examples 11, 14, 15 and 16 describe the spinning of fibers, it should be realized that other shaped articles such as films, tubular extrudates, hollow fibers, casings and membranes can also be prepared via these spinning techniques. Composition of cellulose with other re-enforcing materials or blends of cellulose with other polymers that can be dissolved in these systems (such as polyamides, polyesters, polyethers, chitin and urethanes) can also be extruded via these techniques to provide useful cellulose or cellulose-based shaped products.

We claim:

1. A process of dissolving cellulose comprising mixing activated cellulose at a temperature at which no significant degradation occurs with an amide selected from the group consisting of dimethylacetamide, 1-methyl-2-pyrrolidinone and mixtures thereof and from 3 to 12% by weight of the solution of lithium chloride and
dissolving said cellulose without significant degradation thereof in said amide and lithium chloride in the substantial absence of any polar medium other than the amide.

2. The process of claim 1 in which the cellulose is activated by penetration with a polar medium which swells the cellulose, which polar medium, other than the amide, is removed prior to dissolution of the cellulose.

3. The process of claim 1 in which activation of the cellulose is aided by microfibrillation of the cellulose.

4. The process of claim 2 in which the polar medium is a liquid which swells the cellulose.

5. The process of claim 2 in which the polar medium is exchanged with a medium less polar than water prior to dissolution.

6. The process of claim 4 in which the polar medium is a liquid selected from the group consisting of water, ammonia, dimethylacetamide and dimethylsulfoxide.

7. The process of claim 2 in which the polar medium is dimethylacetamide vapor.

8. The process of claim 6 in which the polar liquid is water.

9. The process of claim 1 in which the activated cellulose is cellulosic pulp from which the water has not been removed subsequent to pulping.

10. The process of claim 9 in which the water in the cellulose pulp is exchanged with a non-swelling liquid prior to dissolution.

11. The process of claim 2 in which the cellulose is cellulosic pulp which has been dried prior to activation.

12. The process of claim 1 in which dissolution occurs at a temperature of less than 150° C.

13. The process of claim 1 in which dissolution occurs at room temperature.

14. The process of claim 1 in which the amide is dimethylacetamide.

15. The process of claim 1 in which the cellulose is added to the amide in the absence of the lithium chloride, the mixture of cellulose and amide is heated to a temperature of at least 150° C., the mixture is cooled to less than 100° C., the lithium chloride is added and the mixture stirred until solution is complete.

16. A process of dissolving cellulose comprising adding at a temperature at which no significant degradation occurs activated cellulose to an amide selected from the group consisting of dimethylacetamide, 1-methyl-2-pyrrolidinone and mixtures thereof and from 3 to 12% by weight of the solution of lithium chloride and
dissolving said cellulose without significant degradation thereof in said amide and lithium chloride in the substantial absence of any polar medium other than the amide.

17. A process for dissolving cellulose comprising
activating cellulose by penetrating the cellulose with a polar medium which swells the cellulose,
adding at a temperature at which no significant degradation of the cellulose occurs up to 16% by weight of said activated cellulose to an amide selected from the group consisting of dimethylacetamide, 1-methyl-2-pyrrolidinone and mixtures thereof and from 3 to 15% by weight of the solution of lithium chloride and stirring said mixture to form a solution of the cellulose in said amide and lithium chloride.

18. The process of claim 17 in which dissolution occurs at a temperature of less than 150° C.

19. A process of dissolving cellulose to form a solution of cellulose in a solvent comprising
adding at a temperature at which no significant degradation occurs cellulose to a solution containing an amide selected from the group consisting of dimethylacetamide, 1-methyl-2-pyrrolidinone and mixtures thereof, from 3 to 15% by weight of lithium chloride and water,
evaporating the water from said solution until the solution contains less than 5% by weight of water and dissolving the cellulose in said solution.

20. A cellulosic solution containing cellulose, from 3–15% by weight of the solution of lithium chloride and an amide selected from the group consisting of dimethylacetamide and 1-methyl-2-pyrrolidinone.

21. The solution of claim 20 containing up to 5% by weight of a polar medium, other than an amide, having an active hydrogen atom.

22. The solution of claim 21 in which the cellulose is present in an amount up to 16% and the lithium chloride in an amount from 5 to 12%, both by weight based on total solution weight.

23. A process of dissolving cellulose comprising
mixing activated cellulose at a temperature at which no significant degradation occurs with an amide selected from the group consisting of dimethylacetamide, 1-methyl-2-pyrrolidinone and mixtures thereof and from 3 to 15% by weight of the solution of lithium chloride and
dissolving said cellulose without significant degradation thereof in said amide and lithium chloride.

24. The process of claim 1 in which dissolution occurs in the presence of no more than 5% by weight of a polar medium, other than an amide, having an active hydrogen atom.

* * * * *